UNITED STATES PATENT OFFICE.

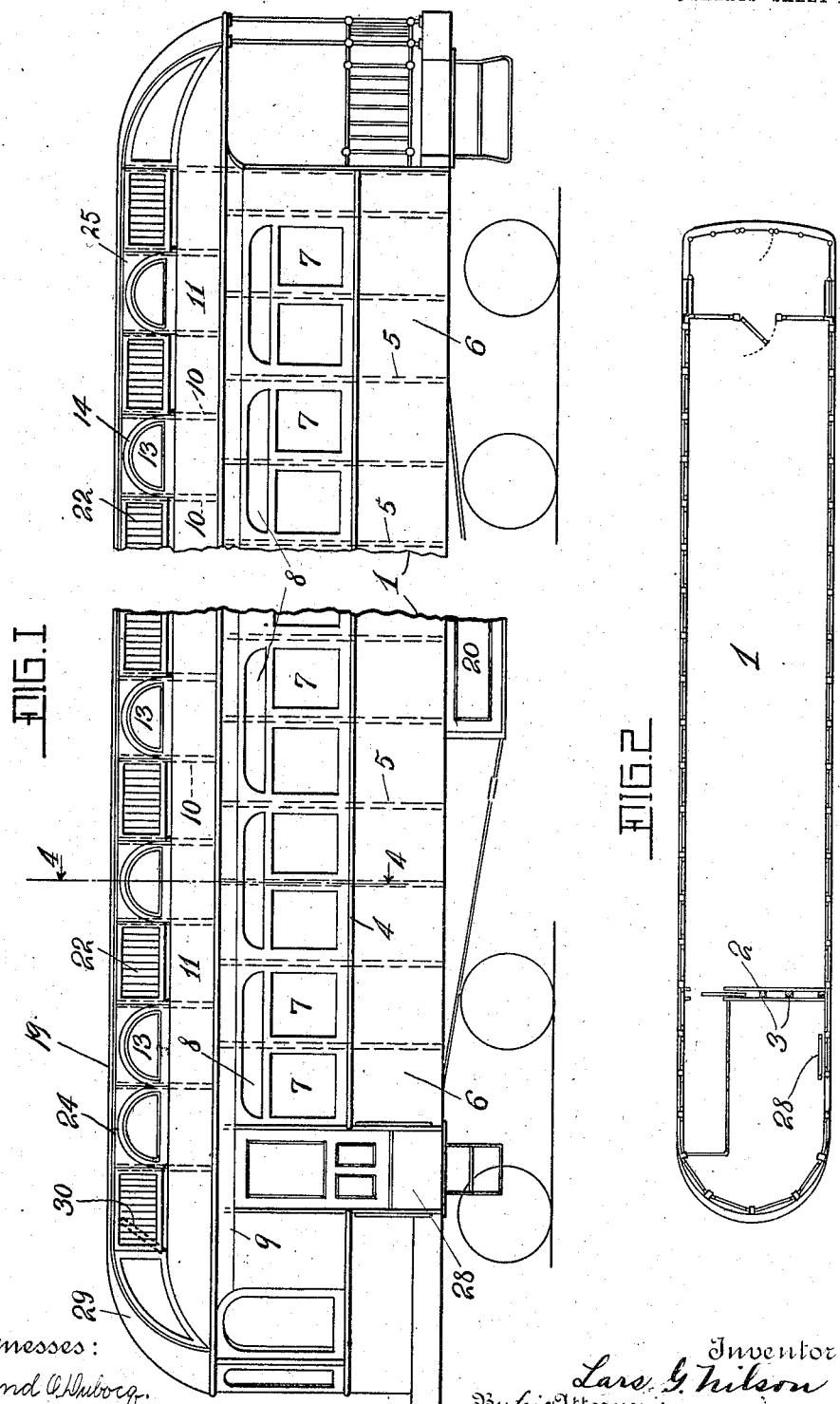

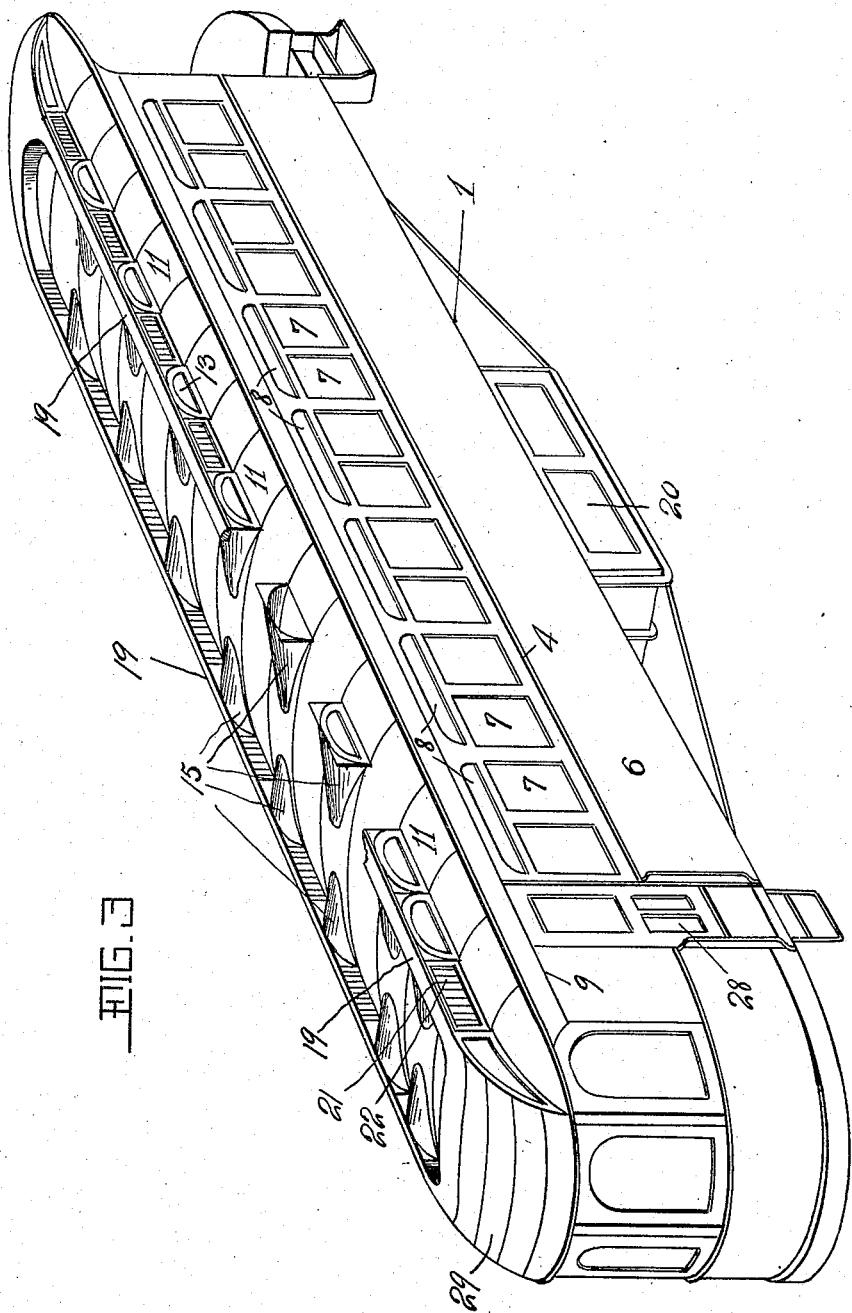

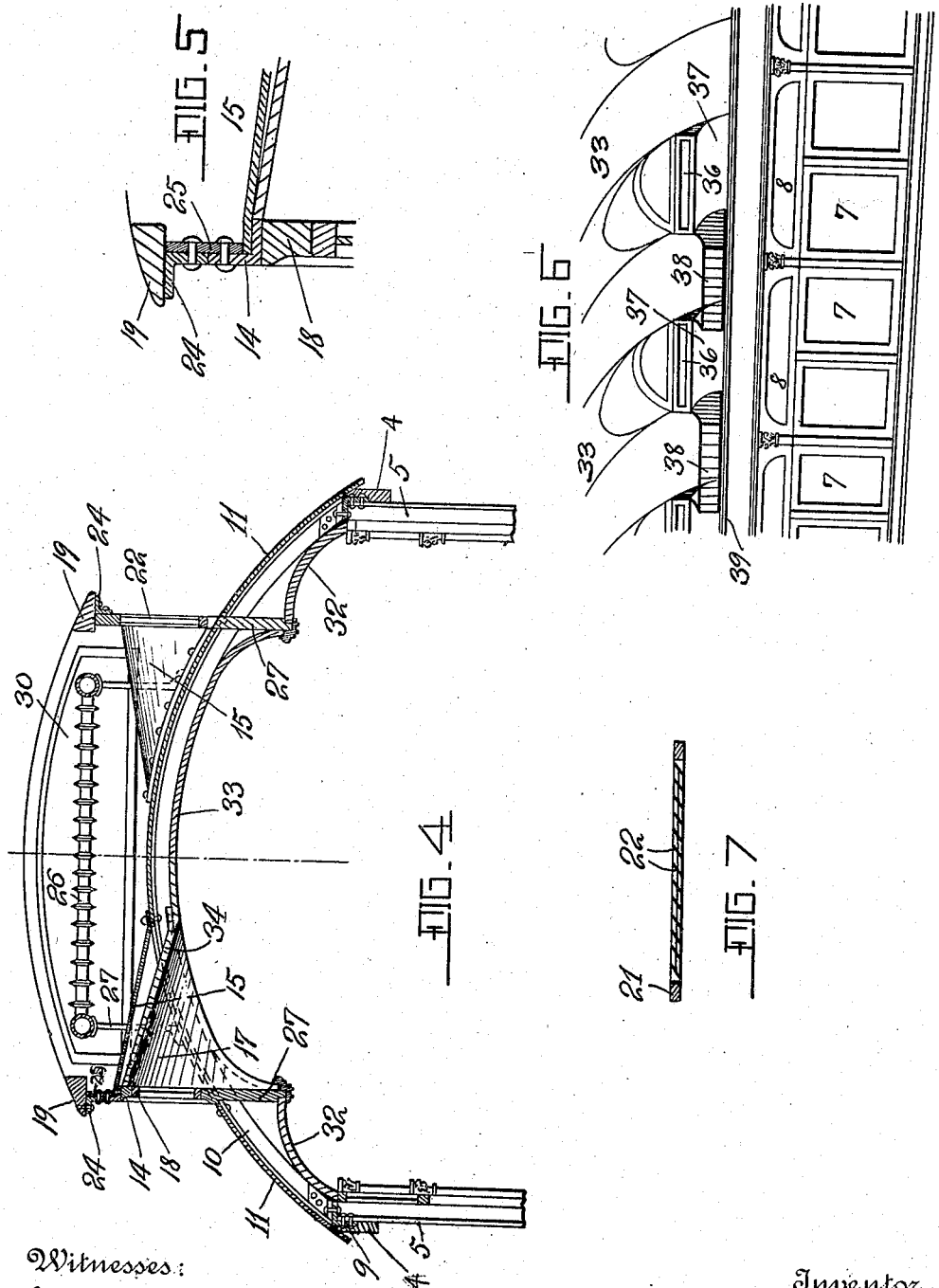

LARS G. NILSON, OF HOBOKEN, NEW JERSEY, ASSIGNOR OF ONE-HALF TO WILLIAM B. STRANG, OF NEW YORK, N. Y.

CAR-ROOF CONSTRUCTION.

No. 919,931.    Specification of Letters Patent.    Patented April 27, 1909.

Application filed June 3, 1907. Serial No. 376,900.

*To all whom it may concern:*

Be it known that I, LARS G. NILSON, a citizen of the United States, residing at Hoboken, in the county of Hudson and State of New Jersey, have invented certain new and useful Improvements in Car-Roof Construction, of which the following is a full, clear, and exact specification.

This invention relates to car roof construction, and has particular reference to a construction of roof wherein the strength will be increased without increase in weight.

The invention also has reference to a roof construction which will be similar in appearance to car roofs in common use, but capable of carrying parts of the car equipment, such as mufflers, coolers and the like.

In ordinary practice, a car roof is made up of rafters and upper sets of carlines connected by vertical deck sections carrying the upper ventilating windows. This construction is satisfactory from the standpoint of ventilation, but is weak considering its weight, owing to the many joints where the rafters and upper carlines join the upper side of the car and the longitudinal stringers forming the deck sills and deck plates. In such cars, the interior finishing has been made up so as to follow the lines of the frame work closely, while in the more ornamental cars, such as Pullman, parlor and sleeping cars, the interior finish has been changed so as to arch over between the lower deck sills and ventilating windows in the upper deck. These windows have been made half oval and placed farther apart than ordinarily, the smaller cross arches opposite the windows being made to join the main arch of the head lining, and producing the general effect commonly known as an empire roof. In some instances, the upper deck carrying the ventilating windows, is dispensed with and the carlines arched uniformly from one side to the other. The interior appearance of such a car is objectionable because of its resemblance to a tunnel, as well as the increased difficulty in securing effective ventilation.

The objects of this invention are to provide a car roof construction in which the weak upper or monitor deck construction for the ventilating windows will be dispensed with, and instead, the carlines arched uniformly across from side to side and carrying the roof plates. Between certain of these carlines, vertical arches will be provided for the ventilating windows and the roof plates cut out somewhat in parabolic form so as to provide ventilating windows somewhat like dormers in the arched roof. The spaces between the window arches will be filled up preferably by gratings so as to have the external appearance of an ordinary monitor deck railroad car, and the interior finish will be broken so as to resemble in general the empire roof. This will leave a space on the roof above the carlines and between the window arches for carrying coolers, radiating coils, etc., and not affecting the appearance of the car. More particularly, such a construction is intended for use in motor cars using the internal combustion engine for power, wherein it is desired to provide space for mufflers, water coolers, tanks, etc., which cannot be conveniently carried under the car. By disposing such devices upon the roof, there will be a free circulation of air from above and through the gratings, as well as an abundance of space.

The invention with reference to a particular form thereof, is shown in the accompanying drawings, wherein—

Figure 1 is a side elevation of a motor car embodying the invention; Fig. 2 is a plan view of the car interior; Fig. 3 is a perspective view showing the external appearance of the roof; Fig. 4 is a cross section on the line 4—4 of Fig. 1; Fig. 5 is a detail, on an enlarged scale, of the upper corner of the roof at the top of a ventilating window; Fig. 6 is a fragmentary perspective of the interior finish of the car; and Fig. 7 is a detail view showing the arrangement of grating for directing the current of air produced by the motion of the car over the radiating coils or other devices on the roof, which it may be desired to cool.

Referring now to Fig. 1, 1 represents the body of a car having an engine compartment at the front end separated by a double partition 2, and suitable wheels mounted on trucks. Between the double walls are blocks of rubber or other vibration absorbing material 3, to prevent the walls from acting as a sounding board. The side of the car is composed of uprights, preferably angles 5, on the outside of which the letterboard 4 and side plates 6 of the car body are fastened. 7 are the windows with the ornamental windows 8 above. 9 are the upper side plates, composed of an angle secured to the upper ends of the uprights 5 with the upper flange turned inward. Uniformly arched across are the carlines 10, which also are preferably composed of angle bars. Carried directly by the carlines 10 are the roof plates 11, which will be secured rigidly to the carlines so as to strengthen them and produce a rigid upper roof structure. It will be here observed that the carlines 10 are located between the uprights 5, and this is to enable the ventilating windows 13 to come preferably over the upper windows 8 and between each pair of windows 7, as this improves the ornamental appearance of the car and will not differ materially in appearance from cars commonly used. The upper ventilating windows 13 are carried by arches 14, between adjacent carlines 10, and the corresponding roof plates are cut out in a somewhat parabolic form, as will appear from Fig. 3 so that a curved plate or hood 15 can be fastened to the arch 14 and to the roof plate. These hoods or curved plates can preferably be made of stampings and thus be very cheap to produce. It will be observed that these do not weaken the roof structure, but provide the openings 17 leading into the top of the car, in which the oval window frames 18 will swing downwardly in the usual manner. The arches 14 are connected by upper longitudinal stringers or deck plates 19, which, at the front and rear, join the platform hoods, as will be seen from the drawings. Between the arches 14 are gratings 21 with vertically extending projecting vanes 22 which will project outward in order to direct a current of air into the spaces between the hoods 15. If desired, these vanes can be made to turn so as to catch the air in whichever direction the car is moving, but ordinarily one end will be the front, and the car will usually go in this direction.

Fig. 5 shows on an enlarged scale, the arrangement in which the upper deck stringers 19 are carried by an angle plate 24 which is secured to the arches 14 by the inside plate 25, so that the outside resembles the appearance of an ordinary monitor decked car, and has adequate ventilation as well as a larger space between the deck stringers for the disposition of coolers, mufflers, tanks, and other devices not having such a weight as to make the car top heavy. 26 represents, for example, a cooler for the water jacket circulation of a gas engine, supported by arms 27 attached to the roof plates and carlines 10, and the outer surface area of this cooler will be proportioned according to the usual practice. Also, mufflers, tanks, and other parts of the equipment can be stored here, as the underbody of the car will ordinarily carry a storage battery 20. At the front end of the car, there is an engine compartment separated by a partition, and by reason of the heat, it is desirable to provide means for ventilating this compartment. This compartment extends across just back of the side door 28, and the front platform hood 29 will be higher than the carlines and open at the top of the engine compartment. This opening will be closed by a pivoted, transversely extending, ventilating door or window 30, which can be operated from the interior in any desired manner. By opening one of the front windows, the desired amount of ventilation of the engine room can be secured without any chance of causing this heated air to be driven into the interior of the car.

The interior finish of the car may be arched uniformly across and carried by the carlines, but preferably this will be somewhat broken by dropping a molding 27 somewhat below the carlines and under the ventilating windows. Head linings 32, 33 and 34 may be put in, as shown in Fig. 4, with suitable ornamental trimmings. Fig. 6 shows the window sills 36 under the ventilating windows dropped down, with a separate piece of head lining 37 connecting it to the interior longitudinal finishing strip 39, which runs the length of the car above the windows. In this construction the spaces between the ventilating windows can be used for racks 38, as shown in Fig. 6, which gives a much increased head room for the racks over that ordinarily provided.

It will, of course, be understood that the general finish forming the interior and exterior can be changed in various respects without varying materially from the principles of the invention.

The invention provides a roof frame work and arrangement which is simple and practical to build, and of great strength, without involving too much of a departure from recognized standards of appearance.

Having thus described my invention, I declare that what I claim as new and desire to secure by Letters Patent, is,—

1. In car roof construction, the combination with uprights and opposite longitudinal plates carried thereby, of curved carlines connected across between the uprights, and arched window frames carried by certain of said carlines.

2. In car roof construction, the combination with uprights and lower longitudinal side plates carried thereby, of stringers carried by said uprights, arched carlines carried by said stringers, arches carried by said carlines within the side stringers, and a roof covering carried by said arches and said carlines.

3. In car roof construction, the combination with uprights and lower longitudinal side plates carried thereby, stringers carried by said uprights, of arched carlines carried by said stringers, arches carried by said carlines within the side stringers, and a roof covering carried by said arches and said carlines, and upper deck stringers carried by said arches.

4. In car roof construction, the combination with uprights and longitudinal side plates carried thereby, of arched carlines carried thereby, and vertical sides carried above the carlines within said sills to give the appearance of a monitor deck.

5. In a car roof construction, the combination with uprights and longitudinal plates carried thereby, of arched car lines carried by the uprights, sides carried above the carlines within said plates, and ventilating windows carried by said sides and opening into the top of the interior between said carlines.

6. In car roof construction, the combination with an upright and a side plate carried thereby at its upper end, of a window at each side of said upright, a carline carried by said plate at either side of said upright, a roof plate supported by said carlines, and a ventilating window carried between said carlines and opening into the interior of the car through said roof plate.

7. In car roof construction, the combination with an upright and a side plate carried thereby at its upper end, of a window at each side of said upright, a uniformly arched carline carried by said plate at either side of said upright, a curved roof plate supported by said carlines, and a ventilating window carried between said carlines and opening into the interior of the car through said roof plate.

8. In car roof construction, the combination with an upright and a side plate carried thereby at its upper end, of a window at each side of said upright, a carline carried by said plate at either side of said upright, a roof plate supported by said carlines, a ventilating window carried between said carlines and opening into the interior of the car through said roof plate, and vertical sides extending across said carlines and containing the ventilating window opening.

9. The combination with a car roof, of a cooling system carried thereon outside the car, and vertical sides having air circulation openings at either side of said cooling system for directing air over said cooling system.

10. The combination with a car roof, of a cooling system carried thereon, and vertical sides having air circulation openings, and ventilating windows opening into the interior of the car.

11. A car roof comprising arched carlines, and raised hoods at the ends connected by sides.

12. A car roof comprising arched carlines, and raised hoods at the ends connected by sides, and ventilating windows in said sides and opening into the upper part of the car.

13. In car roof construction, carlines arched across from side to side, raised hoods at the ends, arches carried by said carlines, and finishing strips across said arches and between the end hoods.

14. A car roof comprising arched carlines, a raised hood at one end, and a transverse ventilating window at the rear of the hood and opening above the carlines.

15. A car roof comprising arched carlines, a raised hood at each end, a transverse ventilating window at the rear of one hood and opening above the carlines, and sides at either end of said window connecting the hoods.

16. A car roof comprising arched carlines, a raised hood at each end, a transverse ventilating window at the rear of one hood and opening above the carlines, sides at either end of said window connecting the hoods, and ventilating windows in said sides opening into the interior of the car.

17. A car roof comprising carlines carrying roof plates, deck sides above the carlines, and alternately arranged ventilating windows opening into the car and air circulation openings in said deck sides opening above the car roof.

18. A car roof comprising carlines carrying roof plates, deck sides above the carlines, alternately arranged ventilating windows opening into the car and air circulation openings opening above the car roof, in said deck sides, and a cooling system carried by said carlines and cooled by the circulation through said openings.

19. The combination with arched carlines, of ventilating windows carried above said carlines at intervals between adjacent carlines, vertical facings below the lower sides of said windows, and curved facings connecting said vertical facings and the lower edges of said carlines.

20. The combination with arched carlines, of ventilating windows carried above said carlines at intervals between adjacent carlines, vertical facings below the lower sides of said windows, curved facings connecting said vertical facings and the lower edges of said carlines, and arched facings following the general interior contour of the carlines not having windows.

In testimony whereof I affix my signature, in presence of two witnesses.

LARS G. NILSON.

Witnesses:
JULIAN S. WOSTER,
GEO. A. HOFFMAN.